United States Patent [19]

Kawano

[11] Patent Number: 4,704,733
[45] Date of Patent: Nov. 3, 1987

[54] CELL ENHANCER FOR CELLULAR RADIO TELEPHONE SYSTEM HAVING DIVERSITY FUNCTION

[76] Inventor: Minoru Kawano, 867 Leopard Trail, Winter Springs, Fla. 32708

[21] Appl. No.: 809,078

[22] Filed: Dec. 16, 1985

[51] Int. Cl.$^4$ .............................................. H04B 7/14
[52] U.S. Cl. ...................................... 455/16; 455/17; 455/33; 370/35; 379/338
[58] Field of Search ................... 455/17, 33, 49, 53, 455/54, 56, 76, 5, 8, 10, 16, 15; 370/30, 95; 179/170 HF; 379/338

[56] References Cited

U.S. PATENT DOCUMENTS

| | | | |
|---|---|---|---|
| 3,022,504 | 2/1962 | Stroud et al. | 370/30 |
| 4,222,115 | 9/1980 | Cooper et al. | 455/33 |
| 4,356,484 | 10/1982 | Eckhardt | 370/95 |
| 4,476,575 | 10/1984 | Franke et al. | 455/76 |

FOREIGN PATENT DOCUMENTS 0055743 4/1985 Japan ............................ 179/170 HF

OTHER PUBLICATIONS

Anon, "2 GHz Repeater Built Without i-f", Jun. 1976, p. 16.
Oades, "The Linear RF Repeater", Jun. 1980, pp. 6.2.1–6.2.5.

Primary Examiner—Jin F. Ng
Assistant Examiner—Elissa Seidenglanz
Attorney, Agent, or Firm—Cesari and McKenna

[57] ABSTRACT

A cell enhancer for use by one cellular provider in a cellular radio-telephone system particularly in a cell including a diversity function includes a first amplifier system for amplifying both up-link and down-link signals between a first set of upstream and downstream antennas and a second amplifier system for amplifying at least the up-link signals between a second set of upstream and downstream antennas. The upstream antennas have a selected minimum correlation between them to ensure that the diversity at the cell site is maintained.

4 Claims, 4 Drawing Figures

CELL ENHANCER FOR CELLULAR RADIO TELEPHONE SYSTEM HAVING DIVERSITY FUNCTION

BACKGROUND OF THE INVENTION

1. Field of the Invention

The invention relates generally to the field of amplifying devices for radio-frequency signals, and more specifically to amplifying systems for eliminating or overcoming dead spots in cellular radio-telephone systems caused by obstructions such as buildings or hills that block cellular radio-telephone signals in at least some portions of a cell.

2. Description of the Prior Art

Cellular radio-telephone systems have recently been introduced in a number of areas to provide telephone coverage for people who need to have access to telephones from outside of their offices or are otherwise unable to get to telephones that are hard-wired to a central office over conventional telephone lines.

In cellular radio-telephone systems, an area is divided into a plurality of small regions, or "cells", each of which is covered by a relatively low-power transmitter. Currently, cellular radio telephone service is provided in the 825 to 845 MHz and 870 to 890 MHz frequency bands. The higher frequency band is used for "down-link" transmissions from the "cell site" for reception by the subscriber. The "cell site" is the location of the transmitter, or, more specifically, the location of the antenna from which transmissions are effected for the cell. The lower frequency band is used for "up-link" transmissions from the subscriber in the cell for reception by the receiving equipment which is also located at the cell site.

Each frequency band assigned to the cellular radio telephone system is divided into two parts, with one part being reserved for the local telephone company and the other half being franchised to a competing service provider. Each channel has a thirty kilohertz bandwidth, allowing for 666 channels in each twenty megahertz band, with 333 being provided to the telephone company and the same number to the franchise. Most of the channels are used for voice transmission and the rest are used for transmission of paging/access control information.

Since a cellular radio telephone system uses relatively low power and since the wavelengths of the signals is short, obstructions, such as buildings and mountains which may be present between the cell site and a subscriber at various locations in a cell, can cause significant degradation in the signal levels, in some areas reducing them to unusable levels. Increasing the power of the signals may raise them to levels which are acceptable in those areas, but that could cause several problems. First, while adjacent cells do not use the same channels, at least some of the next closest cells will use the same channels, and raising power in some cells will cause interference in those other cells. Further more, raising the power of a signal in one channel may cause adjacent channel interference between channels in adjacent cells.

In any event, increasing power of the signal transmitted from a cell site will do nothing to enhance the signal the cell site receives from the subscriber. Indeed, the amount of power that a subscriber can transmit is limited at least by the capacity of battery, specifically in case of a portable telephone subscriber.

U.S. patent application Ser. No. 787,332, filed Oct. 15, 1985, discloses several embodiments of a cell enhancer system having amplifiers in various configurations for receiving, amplifying and retransmitting down-link signals from a cell site into an obstructed area, and also for receiving up-link signals from subscribers in the obstructed area, amplifying them and re-transmitting the amplified signals to the cell site. In one embodiment disclosed in that application, a single wide-band amplifier has an input terminal that receives both up- and down-link signals from antennas through a duplexer network, and that transfers through another duplexer network amplified up- and down-link signals to appropriate antennas for transmission. The wide-band amplifier amplifies all signals in at least the two cellular radio telephone bands.

Problems may arise with the above-described cell enhancer since it does not provide the diversity function that is typically present in the receiving equipment provided at the cell site. The diversity function permits the cell site to receive signals in diverse polarizations, or which come from diverse directions within, for example, an odd-shaped cell. To accomplish this, multiple receiving antennas, each with associated low-voice pre-amplification equipment, are provided at the cell site. The strongest signal received is used as the up-link signal that is passed to the land-line telephony network. The above-described cell enhancer may not be compatible with the diversity function provided by the cell site.

SUMMARY OF THE INVENTION

The invention provides a new and improved cell enhancer including circuits for accommodating a diversity function in the cell.

In brief, the new cell enhancer includes an "upstream" antenna system directed at the cell site for receiving the transmitted down-link signal from the cell site and transmitting two or more up-link signals to the cell site, and a "downstream" antenna system directed into the obstructed region for transmitting the down-link signal into the obstructed region and for receiving two or more up-link signals from the obstructed region. A separate upstream and downstream antenna is provided in the respective antenna systems for each of the up-link signals. The antennas provided for up-link signals have the orientations required to accommodate to the diverse orientations of the up-link antennas at the cell site, to thereby accommodate the cell's diversity function.

The cell enhancer includes a separate wide-band amplifier connected to one up- and down-stream antenna pair for separately amplifying each of the received up-link signals. In one embodiment, a separate antenna pair and wide-band amplifier are provided for the down-link signals. In another embodiment, the down-link antenna pair and amplifier may be combined with one of the uplink amplifiers and antenna pairs.

BRIEF DESCRIPTION OF THE DRAWINGS

The invention is pointed out with particularity in the appended claims. The above and further advantage of the invention will be better understood by referring to the following detailed description of illustrative embodiments taken in conjunction with the accompanying drawings in which:

DETAILED DESCRIPTION OF ILLUSTRATIVE EMBODIMENTS

Figure 1:
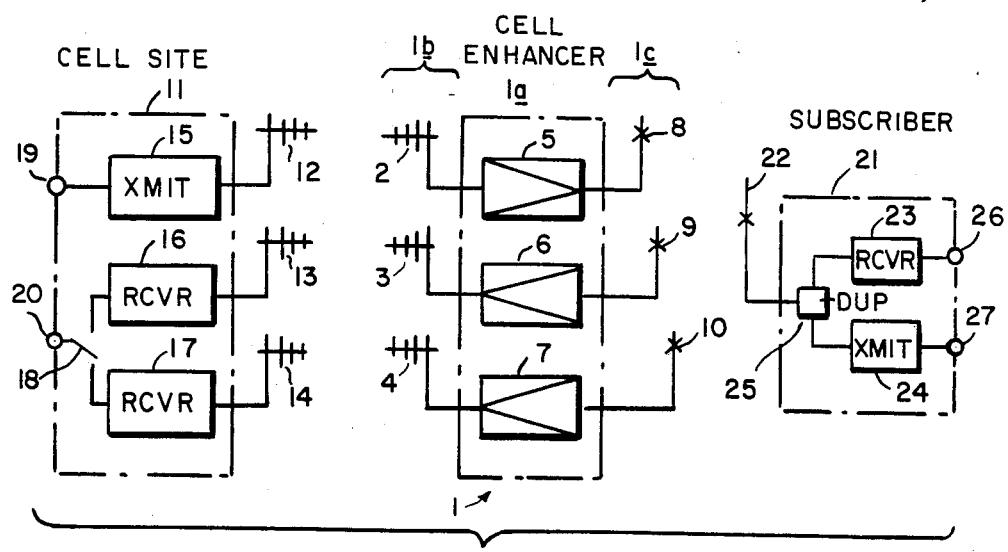
FIG. 1 is a schematic block diagram of a cellular system including a cell enhancer constructed in accordance with this invention.

With reference to FIG. 1, a cell in a cellular telephone system includes a cell site having transceiving equipment 11 for transmitting down-link signals to and receiving up-link signal from a subscriber having transceiving equipment 21. The cell site transceiving equipment 11 includes a transmitter 15 that receives voice and paging control information from other conventional equipment (not shown) in the cellular system through a terminal 19. Transmitter 15 transmits the voice and paging control information in the 870 to 890 MHZ frequency band through antenna 12 as down-link signals.

The transceiving equipment also includes two receivers 16 and 17, which are connected to receive signals containing voice and access control information in the 825 to 845 MHZ frequency band as up-link signals. Receiver 16 receives the signals from an antenna 13 and receiver 17 receives the signals from a second antenna 14. Antennas 13 and 14 are configured to provide a diversity function in the cell. For example, antenna 13 may be horizontally polarized and antenna 14 may be vertically polarized, and each will respond to up-link signals with the corresponding polarization. Alternatively, if the cell is irregularly shaped, antenna 13 may provide general coverage throughout most of the cell and antenna 14 may provide specific coverage in the remainder. A switch 18 connected to the output terminals of both receivers 16 and 17 under control of a conventional control circuit (not shown) couples the strongest output signal from receivers 16 and 17 to a terminal 20. Terminal 20 is connected to couple the up-link voice and access control information to other equipment (not shown) in the cellular system.

The subscriber's transceiving equipment 21 includes an antenna 22 which receives the signals containing the down-link voice and paging control information. A duplexer 25 couples the signals to a receiver 23 which extracts the information from the 870 to 890 MHz signals and couples it to a terminal 26. The transceiving equipment 21 also obtains voice and access control information from a terminal 27, generates the up-link signals in the 825 to 845 MHz band and couples them through duplexer 25 to antenna 22 for transmission to the cell site.

As described in the aforementioned U.S. patent application Ser. No. 787,332, a cell enhancer may be provided to facilitate down-link transmission to, and up-link transmission from, subscribers who may be in areas of the cell which are obstructed by, for example, mountains or large buildings. The cell enhancer described in that application does not, however, fully accommodate a diversity function at the cell site.

A cell enhancer 1 constructed in accordance with the invention includes an amplifier system 1a connected to an upstream antenna system 1b directed at the cell site and a downstream antenna 1c directed into the obstructed area. Amplifier system 10 includes a down-link wide-band amplifier 5 that receives down-link signals through an antenna 2 in antenna system 16, amplifies them and transmits the amplified signals into the obstructed region through an antenna 8 in antenna system 1c.

Cell enhancer 1 also includes two up-link amplifiers 6 and 7. Uplink amplifier 6 receives up-link signals from antenna 9 in downstream antenna system 1c, amplifies them and transmits the amplified signals to the cell site through antenna 3 in upstream antenna system 16. Uplink amplifier 7 receives up-link signals from another antenna 10 in downstream antenna system 1c, amplifies them and transmits the amplified signals to the cell site through a third antenna 4 in the upstream antenna system 16.

Respective upstream antennas 3 and 4 and downstream antennas 9 and 10 are installed at the cell enhancer site to maintain a minimum non-correlation distance between each other, so that the signals from each antenna 3 and 4 do not interfere with signals from the other of antennas 3 and 4. Since the signals, when received at receivers 16 and 17 will then have at least a minimum correlation, the cell site equipment 11 may select the signal with the better quality to couple to terminal 20. The antennas 3, 4 and 9, 10 may have respective correlations similar to the relationships between antennas 13 and 14 at the cell site to accommodate the diversity function at the cell site.

Figure 2:
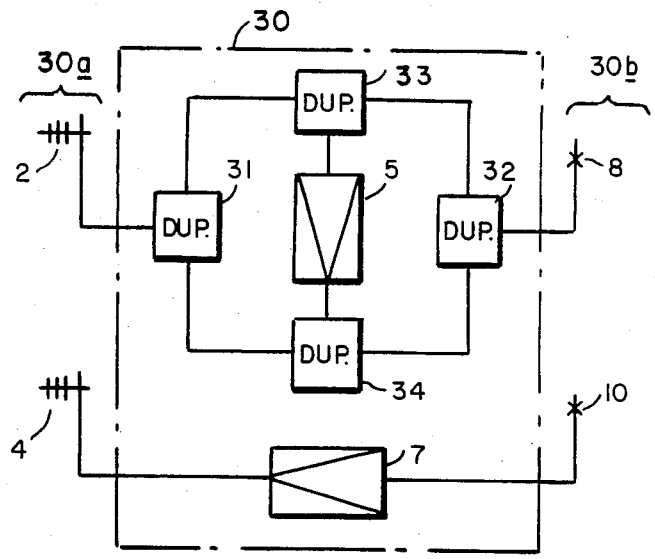
FIGS. 2-4 are block diagrams of additional embodiments of cell enhancers constructed in accordance with the invention.

FIG. 2 depicts a second embodiment of a cell enhancer 30 that is useful as a substitute for cell enhancer 1a depicted in FIG. 1. Cell enhancer 30 includes an upstream antenna system 30a comprising two antennas 2 and 4, a downstream antenna system 30b comprising two antennas 8 and 10, and two wide-band amplifiers 5 and 7. Amplifier 5 serves to amplify both down- and up-link signals, and so only one other up-link amplifier 7 is required to maintain the required diversity.

As shown in FIG. 2, the amplifier 5 receives up-link signals from antenna 8 by way of duplexers 32 and 33. The amplified up-link signals are coupled to antenna 2 by duplexers 34 and 31 for transmission to the cell site. Similarly, the down-link signals from antenna 2 are coupled through duplexers 31 and 33 to amplifier 5. The amplified down-link signal is coupled through duplexers 34 and 32 to antenna 8 for transmission into the obstructed area.

To accommodate the necessary diversity function, antennas 2 and 4 of the upstream antenna system 30a, and antennas 8 and 10 of the downstream antenna system 306, have similar minimum correlation as antennas 3, 4 and 9, 10 in cell enhancer 1 (FIG. 1). To maintain the diversity capability in the up-link signals, a minimum correlation between the antennas in the respective up- and downstream antenna systems 30a and 30b is maintained.

Figure 3:
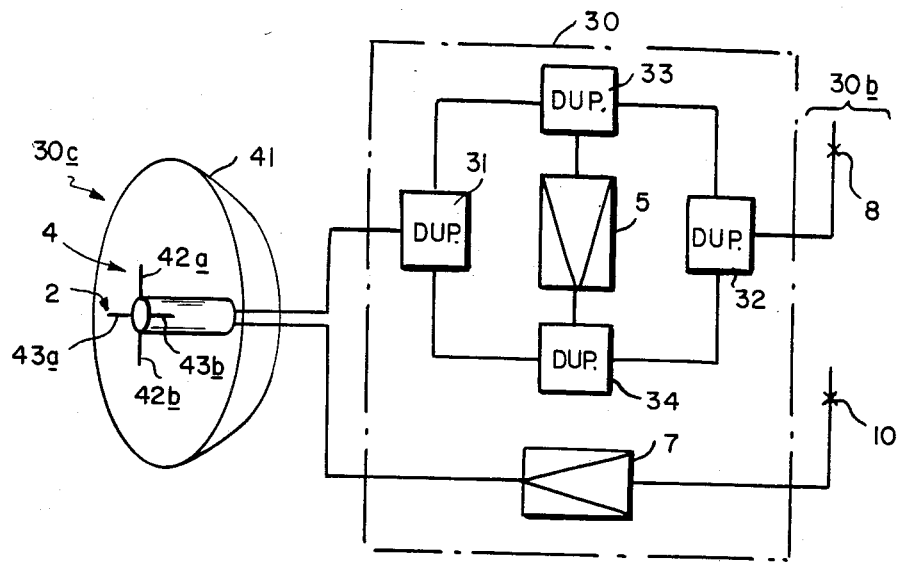

FIG. 3 depicts an embodiment that is similar to the embodiment depicted in FIG. 2, illustrating a specific upstream antenna system 30b (FIG. 2). The upstream antenna system 30b is a parabolic antenna system having horizontally and vertically polarized antennas as respective antennas 2 and 4. Antenna 2, comprising horizontally-directed antenna elements 43a and 43b, provide horizontally-polarized up-link signals, and antenna 4, comprising vertically-directed elements 42a and 42b, provide vertically-directed up-link signals. It will be appreciated that antenna 2 will best receive horizontally-polarized down-link signals and, accordingly, antennas 2 and 4 may be reversed (that is, antenna 2 may comprise elements 42a and 42b and antenna 4 may comprise elements 43a and 43b) if the down-link signals from the cell site are vertically polarized. Since vertically- and horizontally-polarized signals have a minimum correlation between them, the diversity capability in the up-link direction is maintained.

Figure 4:
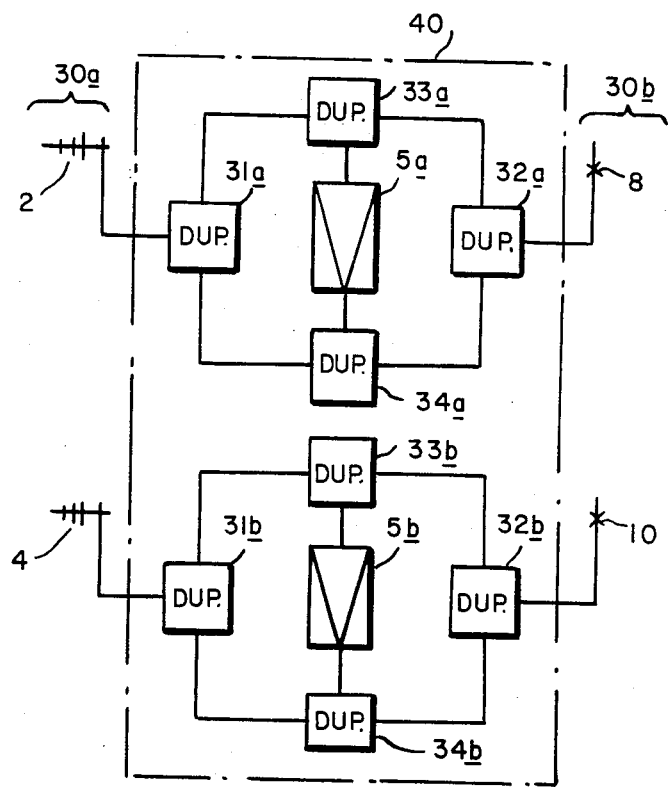

FIG. 4 depicts a further embodiment of a cell enhancer that provides diversity in the down-link direction as well as up-link diversity. Cell enhancer 40a is connected to an upstream antenna system 40a and a downstream antenna system 40b. Cell enhancer 40a includes an amplifier 5a that receives both up-link and down-link signals from antennas 2 and 8 by way of duplexers 31a, 32a and 33a, and couples the amplified signals to the respective antennas through duplexers 34a, 31a and 32a. Amplifier 5a and duplexers 31a, 32a, 33a and 34a operate in the same way as amplifier 5 and duplexers 31, 32 33 and 34 in the cell enhancer 30 depicted in FIG. 2.

Cell enhancer 40a further includes a second amplifier 5b which receives both up-link and down-link signals from antennas 4 and 10 through amplified duplexers 31b, 32b and 33b, amplifies them and couple the amplified signals to the antennas through duplexers 34b, 31 and 32b. In this operation, amplifier 5b and duplexers 31b, 32b, 33b, and 34b operation in the same way as amplifier 5 and duplexers 31, 32, 33 and 34. Additionally, antennas 2, 4, and 8, 10 are depicted in FIG. 4 which maintain a similar minimum correlation to the corresponding antennas depicted in FIG. 2. Since cell enhancer 40 provides amplification of the down-link signals in the path including amplifier 5b, it provides diversity in the down-link signals as well as the up-link signals.

The foregoing description is limited to a specific embodiment of this invention. It will be apparent, however, that this invention can be practiced in systems having diverse basic construction or that use different internal circuitry than is described in the specifications with some or all of the foregoing advantages. Therefore, it is the object of the appended claims to cover all such variations and modifications which come within the true spirit and scope of this invention.

What is claimed as new and desired to be secured by Letters Patent of the United States is:

1. For use in a cellular radio telephone system, a cell enhancer for enhancing duplex communications between a cell site and a subscriber over diverse radio frequency channels comprising:
    A. cell site communications means for receiving signals from and transmitting signals to the cell site over the diverse radio frequency channels;
    B. first subscriber communications means for receiving signals from and transmitting signals to the subscriber over the diverse radio frequency channels;
    C. second subscriber communications means for receiving signals from the subscriber over the diverse radio frequency channels;
    D. at least one cell site signal amplification means for receiving the signals received by said cell site communications means, amplifying the received signals and for coupling the amplified signals to said subscriber communications means for transmission to said subscriber;
    E. first amplification means connected to said cell site communications means and said first subscriber communications means for receiving the signals received by said first subscriber communications means, amplifying the received signals and for coupling the amplified signals to said cell site communications means for transmission to said cell site; and
    F. second amplification means connected to said cell site communications means and said second subscriber communications means for receiving the signals received by said second subscriber communications means, amplifying the received signals and for coupling the amplified signals to said cell site communications means for transmission to said cell site.

2. A cell enhancer as defined in claim 1 wherein:
    A. each of said first and second subscriber communications means and said cell site communications means includes antenna means for converting signals received from and transmitted to the cell site or the subscriber between electromagnetic signals and electrical signals;
    B. said first subscriber communications means and said cell site communications means each further include duplex means for receiving the electrical signals from the respective antenna means and directing them to the input terminal of said first amplification means and for receiving the amplified output signals from said first amplification means and for directing them to said antenna means for conversion to electromagnetic signals for transmission to the respective cell site or subscriber;
    C. said second subscriber communications means further including means for coupling electrical signals from the respective antenna means and directing them to the input terminal of said second amplification means, and said cell site communications means further including means for coupling electrical signals from the output terminal of said second amplification means and directing them to said antenna means for conversion to electromagnetic signals for transmission to said cell site.

3. A cell enhancer as defined in claim 2, wherein said antenna of said cell site communications means includes a parabolic antenna means including cross-polarized radiation elements which radiate electromagnetic signals with minimum correlation factors, one of said radiation elements being connected to the output terminal of said first amplification means and the other of said radiation elements being connected to the output terminal of said second amplification means.

4. A cell enhancer as defined in claim 2 wherein said second subscriber communications means and said cell site communications means each further include duplex means for receiving the electrical signals from the respective antenna means and directing them to the input terminal of said second amplification means and for receiving the amplified output signals from said second amplification means and for directing them to said antenna means for conversion to electromagnetic signals for transmission to the respective cell site or subscriber.

* * * * *